United States Patent [19]

Pfost

[11] 4,380,032
[45] Apr. 12, 1983

[54] TAPE SYSTEM WITH OPTICALLY CONTRASTING DATA MARKS

[75] Inventor: R. Fred Pfost, Los Altos, Calif.
[73] Assignee: Newell Research Corporation, Saratoga, Calif.
[21] Appl. No.: 143,785
[22] Filed: Apr. 25, 1980
[51] Int. Cl.³ ............................................ G11B 15/52
[52] U.S. Cl. .................................. 360/74.6; 360/132
[58] Field of Search ............... 360/74.6, 93, 132, 134; 250/559, 561–563, 571, 572; 242/188, 190, 194, 197–200, 210, 55.19 A; 356/400, 401, 424, 429–431; 365/120, 127

[56] References Cited

U.S. PATENT DOCUMENTS

| | | | |
|---|---|---|---|
| 2,683,568 | 7/1954 | Lindsay | 360/74.6 X |
| 3,288,385 | 11/1966 | Markakis et al. | 242/188 |
| 3,492,668 | 1/1970 | Thomson | 360/134 X |
| 3,497,157 | 2/1970 | Hanes et al. | 242/188 |
| 3,500,438 | 3/1970 | Hunka et al. | 365/120 |
| 3,566,132 | 2/1971 | Walker | 340/74.6 |
| 3,573,471 | 4/1971 | Kolb | 365/127 |
| 3,615,155 | 10/1971 | Gelbman | 242/188 |
| 3,619,625 | 11/1971 | Wood | 250/562 X |
| 3,684,208 | 8/1972 | Larsen | 360/74.6 X |
| 3,800,148 | 3/1974 | DeCock | 250/562 |
| 3,861,619 | 1/1975 | Wolff | 360/74.6 |
| 3,925,817 | 12/1975 | Althuber et al. | 360/74.6 |
| 4,091,426 | 5/1978 | Umeda | 242/188 X |
| 4,123,788 | 10/1978 | Kruger | 360/77 |
| 4,243,891 | 1/1981 | Dobler et al. | 250/571 |

Primary Examiner—Stuart N. Hecker

[57] ABSTRACT

The invention relates to a tape reading system wherein tape in a tape cassette has color marks (133a, b, c) on the tape to be read by an optical system, part of which is in the cassette and another part of which is in the tape drive. The part in the cassette consists of an optical element (51) having mutually isolated light transmission paths. The paths carry light reflected from or transmitted through different portions of the width of the magnetic tape (50). This light is directed to optical sensors (63, 65) which are part of the tape drive. A lamp (61), also part of the drive, illuminates the tape so that light shining on the tape will contrast with the color marks. Changes in contrast due to the color marks, transmitted through the optical element, are detected by optical sensors (63, 65) and converted to electrically readable signals. A feedback circuit connected to the lamp and to the sensors provides electrical feedback to the lamp. The level of illumination detected by the sensors is kept constant relative to slow background contrast changes, although a low pass filter prevents the feedback circuit from responding to light signals representing the color marks.

14 Claims, 10 Drawing Figures

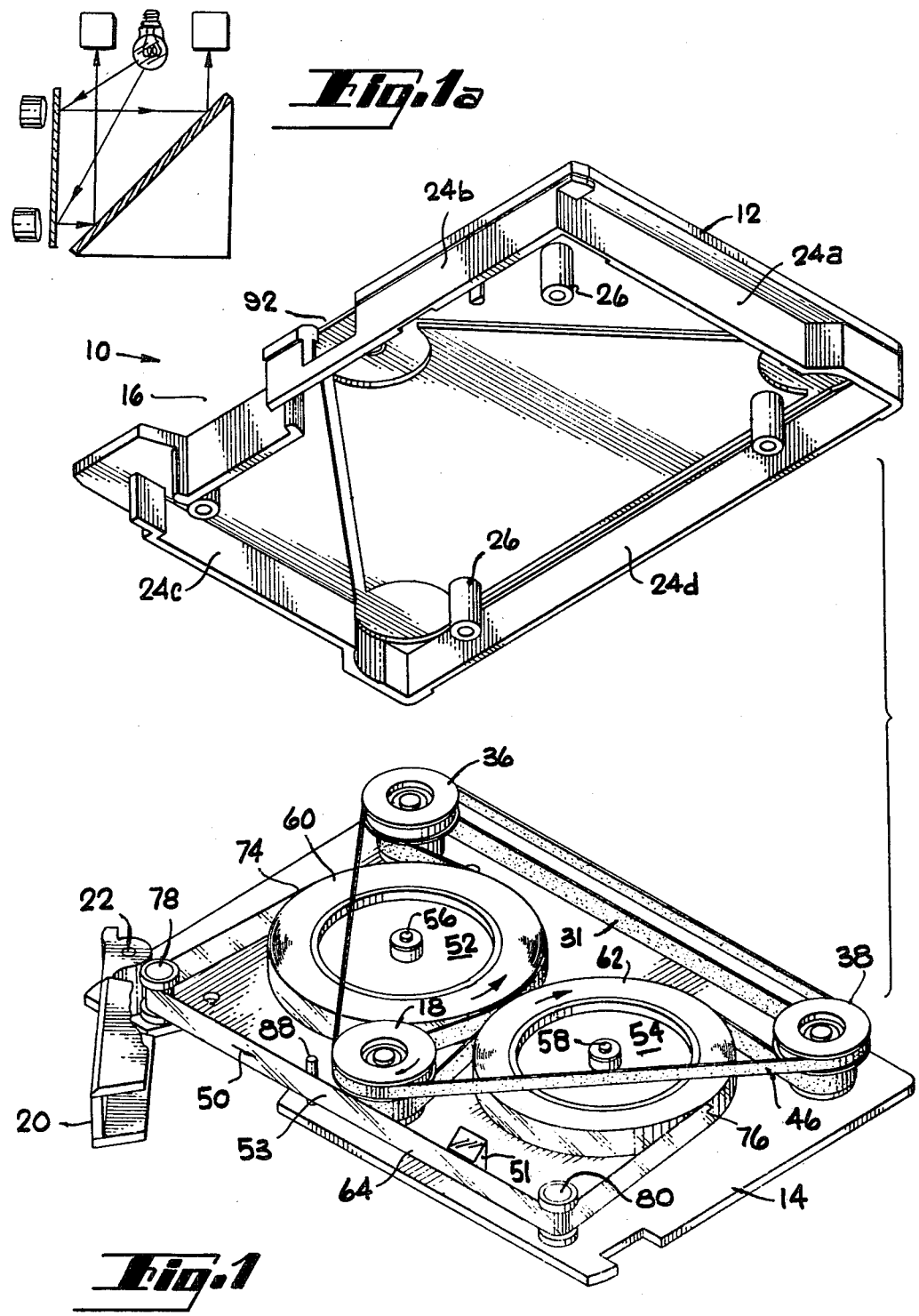

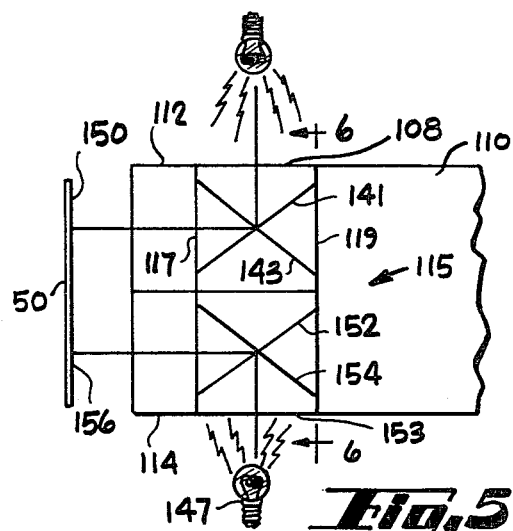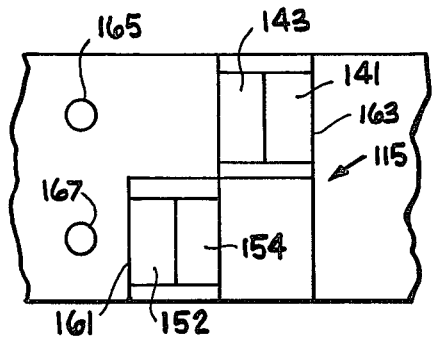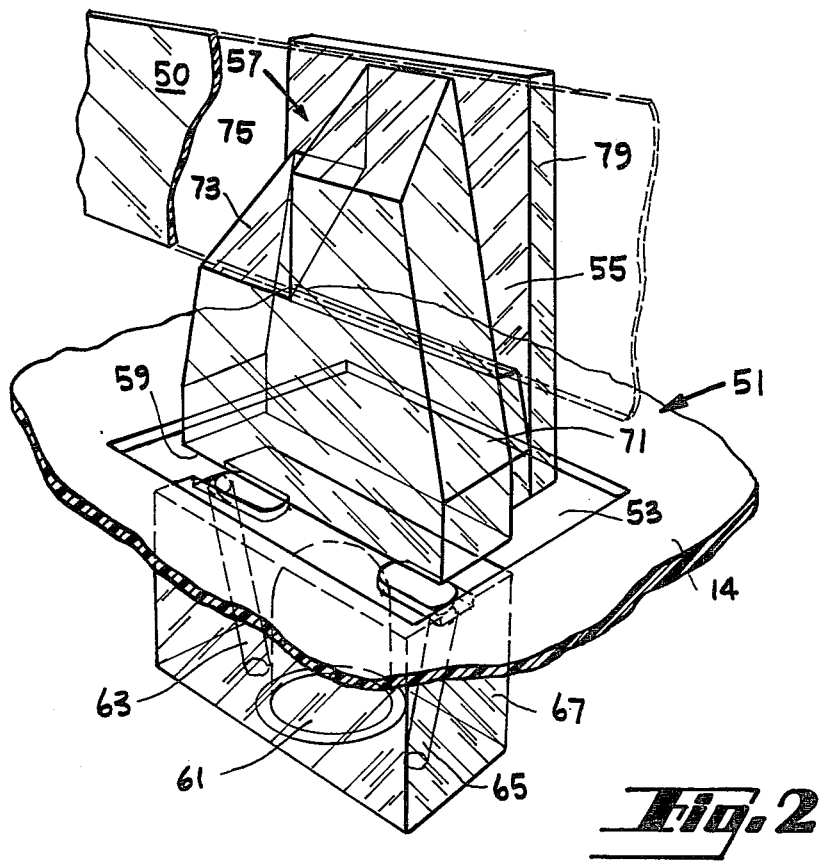

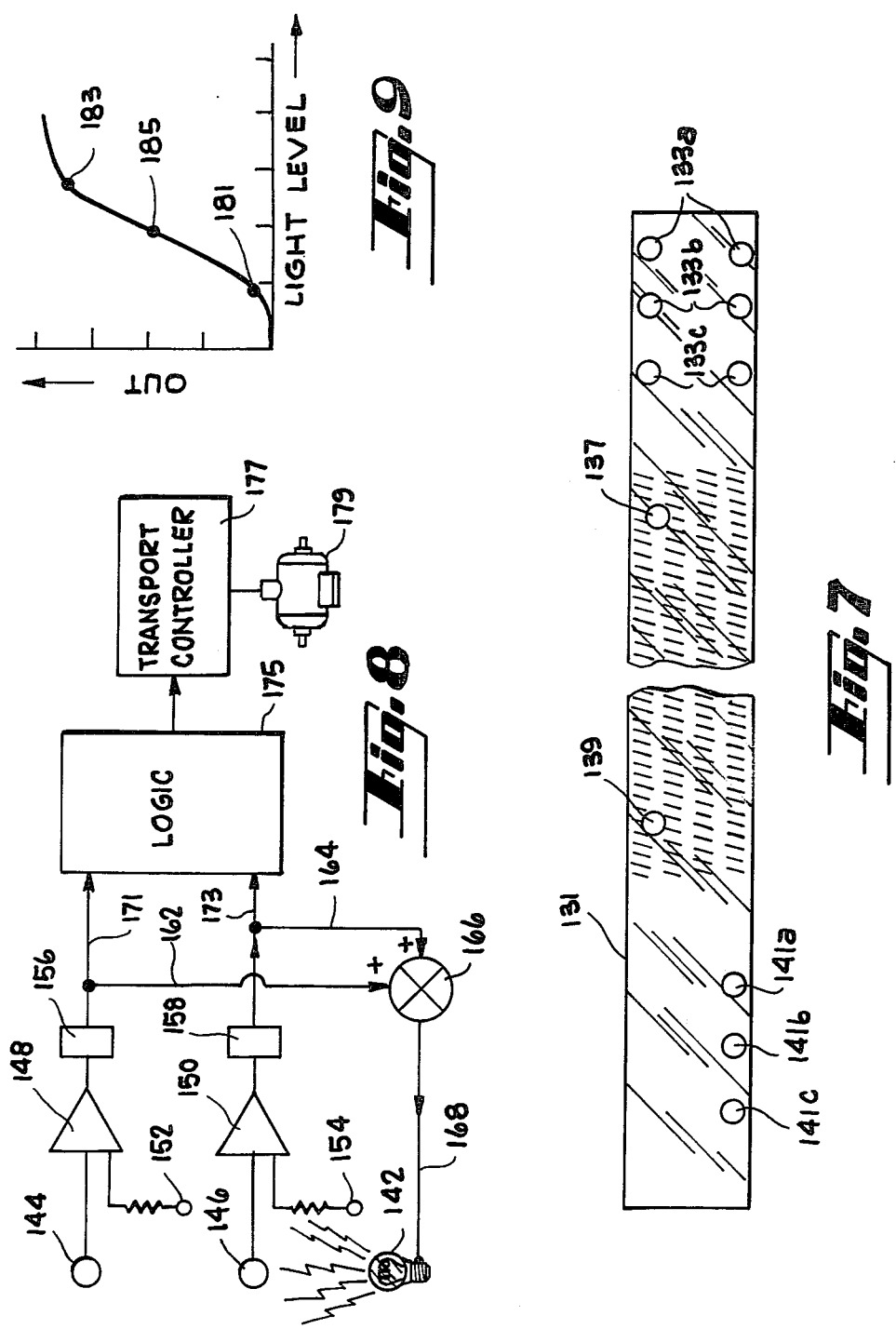

TAPE SYSTEM WITH OPTICALLY CONTRASTING DATA MARKS

DESCRIPTION

1. Technical Field

The invention relates to a system wherein webs, such as tape or film reels, have superposed optically readable marks on the tape and in particular to a tape cassette system having optics for reading such marks.

2. Background Art

In tape or film drive systems such as magnetic tape and film recorders or playback devices, the web is often drawn from a supply roll onto a take-up roll, all within a signle container. The transducing system interfaces with the web through an opening in the enclosure. Such a tape container system is usually called a cassette or a cartridge. For purposes of this application, magnetic or other tape rolls and reels, film on reels, printing ribbons on spools and other flat, rolled webs of material are all referred to as "tape".

In tape cassettes, particularly magnetic tape cassettes, it is important that the tape web not be allowed to run off the supply or take-up rolls in the forward or reverse directions respectively. In low cost magnetic tape cassettes a strong leader and trailer is attached to the beginning of tape (BOT) and end of tape (EOT), with the other end of the leader and trailer attached mechanically to the supply and takeup rolls respectively. Upon reaching EOT or BOT the drive mechanism is stalled. In computer systems, the high torque required for rapid acceleration makes it impractical to stall the drive at EOT and BOT. Further, a load-print indication and early warning indication is required within the body of the recording web before the end of the web is reached. This requirement has been fulfilled in the prior art through the use of foils or holes at EOT, BOT, load and early warning control points. In the former case the foil may either be conductive and by completing an electronic circuit indicate its presence, or reflective, in which case a light beam is reflected into a light detector to indicate the foil presence. This is shown in U.S. Pat. No. 3,684,208. In the case of holes in light beam transmits through the hole to the light detector, as shown in U.S. Pat. No. 3,861,619. The precise position of holes marking EOT, DOT, load and early warning control points has been specified for certain size cassettes by the American National Standards Institute, for example in ANSI X3B1/625.

Each prior method of detecting control points in magnetic tape has advantages and disadvantages. Foils may be placed on the reverse side of the tape in such a manner that they do not disturb the recording surface. However, such foils have a finite thickness and will disturb the concentricity of the tape roll, and if the foil is less than the full width of the web it will cause the web to wind unevenly, producing a bump or skewing the tape. Such perturbations in the tape roll are particularly undesirable where the roll is driven by a belt engaging the rims of the tape.

The roll perturbations from foils can be eliminated by punching holes through the tape and using the holes to mark control points. However, the holes disturb the recording surface and unless they are very small with respect to the data track width can cause a loss of data.

The present invention relies on sensing information marks, such as spots or stripes, whose color contrasts with a web medium on which the marks are placed.

Optical sensing of webs for optically contrasting random defects is known. In particular, U.S. Pat. No. 3,800,148 shows an optical device for sensing flaws in a moving web. A plurality of photocells is disposed across the web, each having an automatic gain control circuit keeping the average output of the detectors at a predetermined level, but allowing signal changes due to random discontinuities to be detected.

An object of this invention is to optically read information on tape webs and the like and more particularly to provide a sensing system which will automatically adjust its sensitivity to detect very small changes in contrast ratio between the tape and very small marks of contrasting color relative to the tape. Such a system will provide control information, such as the EOT, BOT, load, and early warning control points on magnetic tape and similar materials.

DISCLOSURE OF INVENTION

The above object is achieved with a tape winding and unwinding system wherein color marks are applied to tape in containers as signals. These signals are optically sensed by a lamp and sensor combination which are part of a tape drive. The container includes an optical element having a structure such that different portions of the width of the tape can be scanned, yet light from each of these different tape portions is at least partially isolated in different light paths with respect to other portions. The light paths in the optical element direct light from these different tape portions out of the container to a number of light sensors corresponding to the number of light paths. The sensors are connected to a feedback circuit, including a low pass filter, for discriminating between slow contrast changes characteristic of background phenomena and fast contrast changes characteristic of the color marks. The feedback circuit provides feedback to a light source illuminating the tape so that the level of illumination detected by the sensors from the tape is approximately constant, notwithstanding aging of the source, background contrast changes or the like. One particular application for the color marks of the present invention is in marking control points on a magnetic tape, such as EOT, BOT, load and early warning.

An advantage of color marks is that the strength of the tape is not impaired. Another advantage of color marks is that the concentricity of the tape roll is not affected, nor is the evenness of winding. Moreover, for magnetic tape the information density on tape is enhanced by adding tracks of optically readable information, in addition to magnetically readable information.

BRIEF DESCRIPTION OF DRAWINGS

FIG. 1 is a perspective view of a typical tape cassette for use in the system of the present invention.

FIG. 1a is a side plan view of a mirror for reading color spots on tape in the cassette of FIG. 1.

FIG. 2 is a perspective detail view of a multi-path light pipe for reading color spots on tape in the cassette of FIG. 1.

FIG. 5 is a side plan view of a multi-path mirror array for reding color spots on tape in the cassette of FIG. 1.

FIG. 6 is a rear view of the mirror array of FIG. 5 taken along lines 6—6 of FIG. 5.

FIG. 7 is a plan view of tape marked with color spots in accord with the present invention.

FIG. 8 is a simplified electrical diagram showing an feedback circuit for light sensors used in the present invention.

FIG. 9 is a graph of sensor output versus light level for illustrating operation of the sensors and the feedback circuit of FIG. 8.

Figure 4:
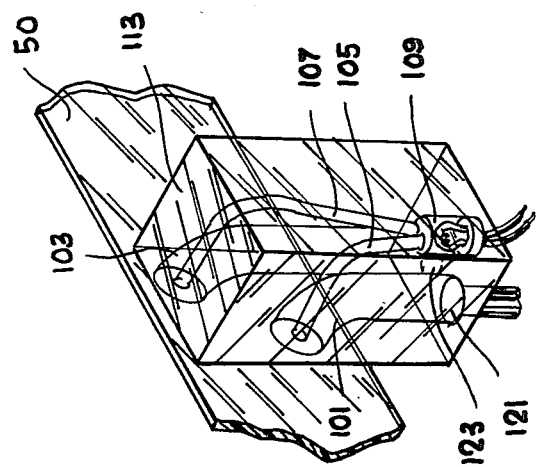
FIG. 4 is a perspective detail view of an alternate light pipe for reading color spots on magnetic tape in the cassette of FIG. 1.

Best Mode for Carrying out the Invention

Referring now to the drawings, FIG. 1 shows a sample tape cassette configuration especially suited for electronic data processing applications using magnetic tape. The invention is not restricted to magnetic tape, but is applicable to other webs being wound and unwound. Similarly, the invention is described relative to tape cassettes, but the invention is applicable to other containers as well, or even to open reels mounted on supports.

A suitable cassette for use in this invention is described in prior U.S. Pat. No. 4,172,569, assigned to the assignee of this invention. A short description of this cassette is preferable because of high tape speeds which can be attained, cassettes, cartridges and other containers with other constructions may be used.

A cassette 10 includes a plastic molded case upper wall 12 and a lower metal wall 4. Dimensionally the cassette conforms to the previously mentioned standard ANSI X3B1/625. This standard dictates the general overall dimensions of the cassette, including the position and size of a head aperture or port 16, the position of a rotary drive and belt guide member 18, and the size, shape and position of a tape guard 20, which is mounted for rotation about a pin 22 fixed to lower wall 14 in order to render the cassette compatible with existing commercially available equipment. The molded plastic upper wall 12 has sidewalls 24a, 24b, 24c and 24d configured to space the lower wall 14 from upper wall 12. Upper wall 12 is provided with a set of similar legs, 26, for mounting the upper wall to the lower wall 14 by means of screws, not shown, through a set of plate holes, 28.

First and second hubs 52, 54 act as the tape supply and take-up hubs and are rotatably mounted with parallel axes of rotation and in a generally coplanar relationship on the lower wall 14 by means of a pair of axial shafts 56, 58. A length of magnetic tape 50 having a nominally 0.001 inch backing thickness, or thinner, the backing made of Mylar, is distributed within the cassette 10, having one end portion or roll 60 wound on the first hub 52, an opposite end portion or roll 62 wound on the second hub 54, and an intermediate portion 64 extending between the hubs from a peripheral point 74 on tape roll 60 to a peripheral point 76 on tape roll 62. In operation the tape 50 passes between the rolls 60, 62 in a path parallel to the lower wall 14. The tape backing has a coating of magnetic material completely across the width of the tape, the width being 0.25 inch.

The intermediate portion 64 of the tape is trained over a pair of similar tape guides 78, 80 which are non-rotatably fixed to the wall 14. The tape guides 78, 80 provide proper alignment of the tape 50 with the aperture 16, as per ANSI standard X3B1/625 in order to maintain a proper operational relationship with a magnetic recording head which may be part of a tape drive, not shown, approaching the tape at the magnetic head position 41 when in operative placement with the tape drive. A tape support pin 88 fixed to the lower wall 14 prevents the tape 50 from touching the drive and belt guide member 18 while the head is in operational contact with recording tape 50. The tape 50 runs parallel to the sidewall 24b and past an optical element 51, described below with reference to FIG. 2. The optical element 51 is mounted on a transparent window 53 of wall 12 so that light can enter the element from outside of the window.

The drive member 18 is rotatably mounted on a shaft to the lower wall 14 at a centered frontal position on the cassette 10 as per ANSI standard X3B1/625 so as to protrude through an opening 92 in the upper wall 12 for engagement with a drive capstan when the cassette 10 is in operative placement in a record-playback apparatus, not shown.

The pair of similar rotary belt guide members, or idlers, 36, 38 are rotatably mounted on a pair of parallel shafts fixed to the lower wall 14. The idlers 36, 38 each have a stepped construction with pulley portions of different radii for affording different mechanical advantages as described in U.S. Pat. No. 4,172,569. The idlers 36, 38 and drive member 18 are all disposed on axes parallel to the axes of the hubs 52, 54 and are vertically aligned. A tensioning belt 46 is trained about the rotary drive member 18 and idlers 36, 38.

An endless loop drive belt 31 having a fixed length is trained about the drive member 18 and the idlers 36, 38. It is emphasized that the cassette description herein is exemplary and other types of containers could employ the features of the present invention.

Whatever type of container is used, the present invention calls for placement of an optical element 51 in a position for optically communicating from the tape to optical sensors outside of the container, the tape being illuminated by a source outside of the container.

Figure 3:
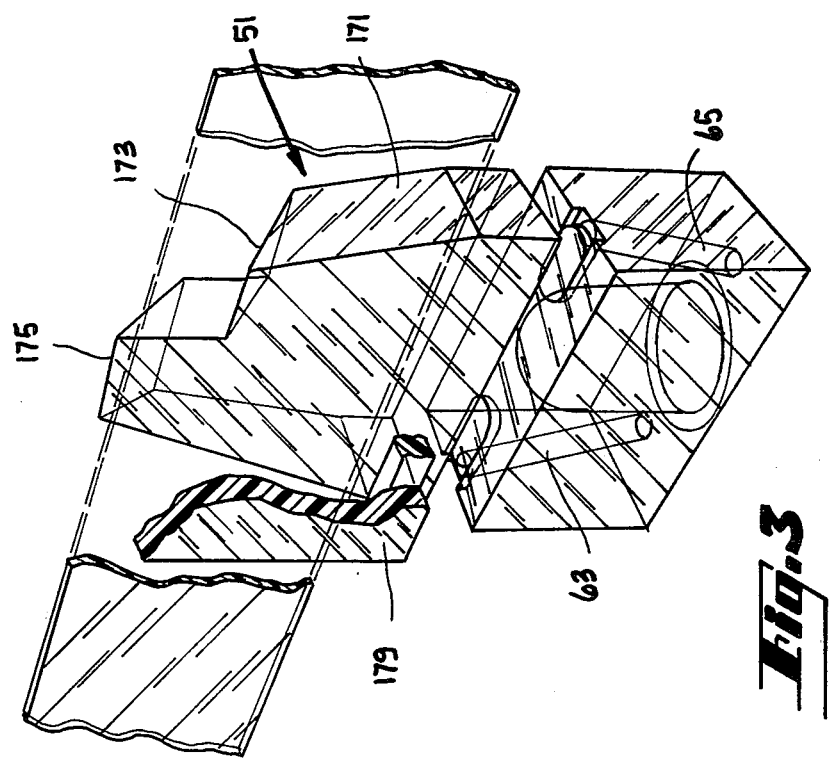
FIG. 3 is a perspective view of a portion of a light pipe similar to the one shown in FIG. 2.

The optical element 51 may be any optical device which is adapted to receive light from different optical tracks on the tape and provide isolated light paths corresponding to the different tracks. These paths extend from the tape directly in front of optical element 51 to light sensors. The paths are mutually optically isolated, at least to the extent that light from contrasting marks in different tracks on the tape can be read and associated with the proper mark. One such optical element is a plane mirror. Another is a multi-path light pipe, a name given to internally reflecting members, such as prisms, fiber optic bundles and the like which can provide plural isolated light paths. Another such optical element is a multi-path mirror array, a term applied to a plurality of mirrors arranged to provide plural isolated light paths. The optical element of FIG. 2 is of the plane mirror type. FIGS. 2, 3 and 4 are of the multi-path light pipe type. The optical element of FIGS. 5 and 6 is a multi-path mirror array.

With reference to FIG. 1a the optical element 51 is seen to comprise a mirror 21 which is supported by an easel 23. Magnetic tape 50 passes in front of the mirror, with the mirror making an angle of approximately 45° with the bottom of the tape. This type of mirror and easel configuration is known in the prior art and is used in the prior art so that illumination from a source 25 in an existing tape drive can illuminate mirror 21, which in turn directs illumination onto tape 50. Under the previously mentioned ANSI standard, tape position is indicated by holes in the tape. Such holes are sensed by light detectors 27a, 28b, placed behind the tape 50 and mounted on a tape drive or reproducing machine. Such tape drives having light detectors in these positions are in widespread use today and the present invention contemplates tape containers which are compatible with such existing units. However, many existing tape drives will not be able to sense color marks on the tape in accord with the present invention. Nevertheless, tape containers in accord with the present invention can still be used on existing tape drives. Such existing drives handle tape at relatively low speeds compared to newer drives moving tape at faster velocities and higher accelerations than previously. The color marks of the present invention allows tape of the present invention to be recognized and played at high speeds in new high speed drives and because of the presence of holes in the tape to be played at low speeds in existing drives. Holes in the tape are required to satisfy the previously mentioned ANSI standard. The addition of color marks to such tape provides a means for recognizing tape which can be moved at higher speeds, while producing no more of the disadvantages of holes in the tape, previously discussed.

The color marks on the tape are detected by reflection from tape 50 by sensors 29a and 29b which are adjacent to lamp 25. These sensors are photocells, similar to the light detectors 27a and 27b of the prior art. The photocells 29a and 29b are mounted in a tape drive and positioned in a manner such that the photocell 29a receives light primarily from the bottom of the tape from the region sensed by detector 27a on the opposite side of the tape, while the photocell 29b receives light primarily from the upper portion of the tape, in the region sensed by the detector 27b on the opposite side of the tape.

The tape may be opaque or transparent and may have low reflectivity or high reflectivity in accord with the present invention. The intensity of lamp 25 is adjusted to compensate for low contrast ratios in order to produce a satisfactory detectible signal in the photocells 29a and 29b, as discussed below. In other words, color spots on the back side of tape 50 are illuminated by lamp 25 and sensed by the photocells 29a and 29b against the background provided by the tape backing or substrate. The contrast between the color spots and the backing is what the photocells 29a and 29b detect. For very thin tape which is transmissive to light, existing tape drives may be modified so that detectors 27a and 27b, which normally detect only holes, detect contrast changes in the same manner that the photocells 29a and 29b detect such changes. The principal advantage of detectors positioned adjacent to the source 25, such as the photocells 29a and 29b, is that both opaque and light transmissive tapes can be read by these detectors.

The optical element 51 may be modified so that there is greater isolation in the light paths corresponding to different optical tracks on the tape. Such modifications are described in FIGS. 2-4 below.

Certain of the following descriptions show tape illumination and detection of optical signals through the bottom of a tape container. Illumination and detection through the bottom wall of a container is not compatible with the present ANSI standards. For ANSI compatible detection, the window through which the tape is illuminated must be in the upper wall of the tape container, not the bottom wall. Whether the windowed wall is the upper or lower wall of the tape container depends on the location of the illumination source. For simplicity of illustration, illumination and detection in FIGS. 2-4 is shown through the bottom wall of a container, but it will be realized that for present ANSI standards for one quarter inch tape cassettes, the optical element would be mounted near a window in the upper wall of the tape container.

With reference to FIG. 2, the optical element 51a is seen to rest on bottom wall 14 which has a translucent window 53. Optical element 51a has two mutually isolated light paths from lower and upper portions of tape 50, through the optical element, toward physically separated light sensors 63 and 65, located outside of the optical element. As tape is moved past the optical element, the element scans lower and upper portions of the tape so that optical data tracks, i.e. longitudinal paths, wherein information is written using color marks on the tape, defined in these respective tape portions can be scanned.

For opaque tape the optical element 51a is positioned to receive light reflected from the tape which passes into the lower and upper portions of the optical element and then the reflected light is guided toward separate sensors, one corresponding to each light path. The reflection from the tape is usually not specular reflection, as from a shiny metallic surface, but is diffuse reflection, resembling scattering. The source intensity is maintained by electrical feedback, as explained below, at a sufficient level so that reflected contrast changes due to color marks on the tape can be observed, without causing ablation, melting, shrinking, stretching or other damage to the tape surface.

For light transmissive tape the optical element may be positioned facing either side of the tape relative to light impinging on the tape from the source. In one case, the optical element will scan the tape for changes in reflectivity, as mentioned above. In the other case, the optical element will scan the tape for changes in transmissivity. Of course, optical elements may be provided on both sides of the tape for simultaneous reflective and transmissive scanning.

Optical element 51a has a staircase configuration parallel to the length of the tape consisting of a pedestal portion 71 supporting a plurality of prisms at different elevations relative to tape 50. These include a first prism 73 having a flat side facing the lower portion of tape 50 and a second prism 75 having a flat side facing the upper portion of tape 50. Together, the sides of prisms 73 and 75, facing magnetic tape 50, form a pair of input apertures 57 of the light pipe. The staircase support for the two prisms provides a good degree of optical isolation between the light paths originating at the input apertures of the two prisms.

The base or bottom 59 of pedestal portion 71 forms an output aperture for the optical element. The pedestal portion 71 and the prisms 73 and 75 form a light transmission means for transmitting light from each prism input aperture to the output aperture of the pedestal while maintaining isolation within the element for the light paths carrying light from different portions of the width of the magnetic tape.

It should be noted that the staircase design of the optical element 51a places one of the input apertures slightly downstream of the other input aperture with respect to the direction of tape motion. By having one input aperture slightly downstream of the other, two marks at the same lengthwise position of the tape, but in different optical tracks, will be sensed at slightly different times. In other words, the downstream input aperture will sense the mark which passes by it at a slightly later time than the upstream input aperture senses a mark at the same longitudinal position on the tape, but in a different optical track. The tape may be coded with color marks such that multiple marks in different optical tracks should never be detected simultaneously in multiple paths. Then, if there is such simultaneous detection in multiple paths, an emergency condition has occured, such as breakage of the tape, or tape runoff from the supply hub. For detecting light from such conditions, light from the source is reflected from upright element 79 which has a reflecting surface facing the tape.

Upright element 79 extends upwardly from bottom wall 14 with an upper face spaced slightly from prisms 73 and 75 so as to allow tape 50 to pass therebetween. Preferably the lower portion of upright element 79 is joined to, or a part of, pedestal 71 which supports prisms 73 and 75. The gap between upright element 79 and the prisms serves to guide tape 50 directly in front of the prisms for sensing color marks on the tape. Use of upright element 59 is optional for sensing emergency conditions. Another way to sense such conditions is to place light sensors opposite the locations where light is reflected from the tape. Large increases in detected light by these sensors indicate an emergency condition. Many existing tape drives have dual light sensors, one atop the other, as shown in U.S. Pat. No. 3,861,619, which can be used to sense emergency tape conditions without upright element 79. Such conditions would be indicated by a high level of light across the tape path for a relatively long time compared to the duration of light passing through any holes in the tape.

A lamp 61 has divergent illumination emerging therefrom, such that illumination is provided to the entirety of pedestal 71 which, in turn, transmits the light to the lower and upper prisms 73 and 75, thereby illuminating tape 50 immediately in front of input apertures 57. Light may be reflected directly from the tape 50 or be partially transmitted through the tape 50 to the upright element 79 having a reflecting surface facing the tape so that light is reflected back to the prisms. On return, reflected light gathered by prism 73 is directed downwardly through output aperture 59 into sensor 63. Reflected light gathered by prism 75 is directed downwardly to light sensor 65. Very little light from prism 73 reaches sensor 65 and very little light from prism 75 reaches sensor 63. In this manner, light from source 61 illuminates the entirety of the tape in front of input apertures 57 of the light pipe, but reflected light from the top portion of the tape reaches sensor 65, while light reflected from the lower portion of the tape reaches sensor 63. The sensors may be photocells, such as photodiodes or phototransistors. Such devices produce electrical signals corresponding to the intensity of light impinging thereon. The intensity of the light source 61 is controlled by a feedback circuit from the light sensors 63, and 65, as described below with reference to FIGS. 6 and 8.

FIG. 3 is a perspective view of an optical element 151 similar to the one illustrated in FIG. 2, but having upper and lower prisms reversed. The pedestal portion 171 supports the first prism 173 at a lower elevation relative to a second prism 173 at a higher elevation. The two elevations are such that the first prism 173 scans approximately the bottom half of the width of a magnetic tape running between optical element 171 and reflective backing member 179, while the second prism 175 scans the upper half of the width of the tape. FIG. 3 illustrates the unitary construction of the optical element. Preferably, the optical element is made of a material which enhances internal reflection, such as an acrylic plastic which is polished on all sides after fabrication. Total internal reflection, while desirable, is not necessary, so long as sufficient reflection is preserved to detect optical signals at the sensors 63 and 65 associated with the tape transport.

FIG. 4 shows an alternate optical element for transmitting light to and from the magnetic tape. In this figure, the light pipe forming the optical element includes a pair of fiber optic bundles 101, 103 of large diameter and two fiber optic bundles 105, 107 of smaller diameter. The smaller diameter bundles are joined at one end, 109 and carry light transmitted by a lamp 111. The two larger diameter fiber optic bundles each have an aperture on one side, referred to as a first aperture, which faces the light sensors 121, 123, each of which is a phototransistor or photodiode. At the opposite end each fiber has another aperture which is disposed near tape 50. Both of these apertures are input apertures for the light pipe shown to be supported in a frame 113, such as a plastic block. One input aperture is slightly downstream of the other so that the input apertures have the same staircase design as the prisms of FIGS. 2 and 3 to allow sensing of emergency tape conditions as mentioned above. The frame 113 is mounted as the optical element 51 in FIG. 1.

Operationally, the fiber optic fibers work the same as the optical element illustrated in FIG. 2. Light emerging from lamp 111 is directed onto tape 50 through fiber optic bundles 105 and 107. Light reflected from the tape is gathered by the larger diameter fibers 101 and 103 and returned to the respective sensors 121 and 123. Light illuminating the bottom portion of the tape from fiber 105 is picked up after reflection from the lower portion of tape 50 by the larger diameter fiber 101. Light incident on the upper portion of tape 50 from fiber 107 is picked up by the larger diameter fiber 103, after reflection from the tape. Color marks on the tape change the observed contrast ratio relative to the tape background color. By monitoring contrast ratio, color masks on the tape may be detected.

Other light pipe configurations may be used, so long as there is a light transmission medium which provides at least partial light isolation from different portions of the width of a tape, such as top and bottom portions in the examples of FIGS. 2, 3 and 4. Each of these portions of the tape forms an optical track. There is no need to restrict the number of tracks which is scanned to two. Several parallel tracks extending along the length of the tape can be read with a light pipe which gathers light from each of the optical tracks and transmits the light along isolated paths to light sensors.

Many existing tape drives have light sources directing light into a cassette from the top side thereof, rather than the under side as illustrated in FIGS. 2–4. An example of a cassette having light entering from the top side is illustrated in the previously mentioned U.S. Pat. No. 3,861,619. In that patent, light is directed onto a mirror in the cassette for the purpose of detecting the presence of holes in the tape. FIG. 5 illustrates an embodiment of the present invention wherein narrow mirrors are used so that light can enter the cassette from either the top or the bottom and be directed to the tape. The mirror array of FIG. 5 includes a cassette body 110, which is similar in all respects to cassette 10 of FIG. 1, except for a different type of an optical element therein, together with a window 108 in the top of the cassette for allowing the entry of light. Window 108 is opposite window 153 such that light may enter either the top wall 112 or the bottom wall 114 of the cassette. The optical element 115 consists of a transparent sidewall 117 and a reflective rear wall 119. The optical element 115 may have the same exterior dimensions as the optical element 51 in FIG. 3. Within an upper portion of optical element 115 are two mirrors 141 and 143 which are disposed adjacent to each other and in cross section appear to form an X.

Mirrors 141 and 143 will direct light entering the cassette either from above through window 108 or from below through window 153 to the upper portion of the tape 50. For example, source 145, having a beam which is incident on mirror 141 will illuminate an upper portion 151 of tape 150. On the other hand, a beam originating from source 147, incident on mirror 143 will illuminate the same tape portion. Immediately below the mirrors 141 and 143, and slightly offset therefrom, are mirrors 152 and 154. Since there is a slight offset from the mirror array 141 and 143, the same beam which illuminates mirrors 141 and 143 also illuminates the mirrors 152 and 154. These mirrors direct light from either source 145 or 147 onto the lower portion of tape 150 at region 156.

With reference to FIG. 6, the lower portion 161 of optical element 115 houses the oppositely inclined mirrors 152 and 154. It will be seen that each mirror occupies approximately half the width of the lower portion 161. On the other hand, the upper portion 163 of optical element 115 houses the oppositely inclined mirrors 141 and 143, again each occupying approximately half of the width of the upper portion. Light directed downwardly or upwardly should illuminate the entirety of the width of the optical element. Tape 150 is shown with the color marks 165 and 167 for scanning by the respective upper portion 163 and lower portion 165 of the optical element 115.

In FIG. 7, a length of tape 131 may be seen having three pairs of colors marks 133a, 133b and 133c which mark the BOT points. Three identical pair of marks are provided for redundancy in the event that one set of marks is missed. Note that the code for beginning of tape points involves marks in two optical tracks. The slanted lines 135 indicate magnetic recording tracks. The lengthwise spaced between adjacent magnetic tracks are blank guard tracks. A single color mark 137 in the upper optical track will serve as the load point indicator, while a similar mark 139 near the end of the recording zone is an early warning indicator. The three marks 141a, 141b, 141c indicate the end of the tape. These marks are in the same format as the hole patterns described in the previously mentioned ANSI standard X3B1/625. A magnetic tape may have both a set of holes, as well as colored marks of the present invention. Either holes, or colors marks may be detected, or both, depending on the type of tape drive which is used. Tape drives of the prior art will sense abrupt increases in light intensity when holes are detected. Even for translucent tapes, the holes cause detectors to sense an increase in light intensity, whereas the colored marks of the present invention could cause light attenuation in the sensors which are on the opposite side of the tape from light impringing on translucent tape.

The colored marks which are placed on the tape may be marks which are formed by dyes or by any material which bonds to magnetic tape without cracking or flaking when the tape is bent. A mark which bonds to the tape, chemically or mechanically, is suitable, so long as the magnetic properties of the tape are not affected. The marks should add insignificant thickness to the tape, so that even small bumps will be avoided in forming tape rolls. It is important that the tape have uniform thickness in the presence and absence of color marks. The mark should be applied to the back side of the tape in a manner so as not to print onto overlying or underlyng tape layers in a tape roll. Examples of dyes which may be applied to magnetic tape are known as PVS-90, white and PVS-91, silver, both made by Formulabs Industrial Inks, Inc. of Escondido, California. Such dyes may be applied by roller, brush, printing methods, or by electronic ink jet printing. The dye material may be in solution or may be a powder, such as graphite or a pigment powder. The size of the color marks depends upon the tape speed and frequency response characteristics of the detector circuits. The marks should be large enough to be unambiguously detected. The color of the color marks may be any color or combination of colors which provide contrast relative to the tape background. Low levels of contrast can be detected since the feedback circuit described below increases illumination so that a contrast ratio, exceeding a threshold level can be detected. The color of the marks should enhance detectability considering the color of the substrate on which the marks are applied, the color of the illuminating lamp and the spectral response of the sensors.

FIG. 8 shows a simplified electrical plan for the light sensors and light source of the present invention. Light source 142 directs light to the tape and thence by reflection to the sensors 144 and 146. Each of the sensors is connected to a respective amplifier 148 and 150. These amplifiers are operational amplifiers biased to reference voltages 152 and 154, respectively. Each amplifier is connected to a respective low pass filter 156 and 158. These networks serve to filter background contrast changes from signal contrast changes. Such circuits for background rejection are known and described, for example in U.S. Pat. No. 3,800,148. Signals representing slow contrast changes, indicative of background, are sampled along lines 162 and 164 and fed to a summing junction 166. The two lines 162 and 164 form feedback paths. Summing junction 166, which could be a summing network, produces a single output feedback signal along line 168 which controls the intensity of light source 142.

The reason for controlling the intensity of the source is to provide a level of illumination which is seen to be approximately constant by the light detectors, notwithstanding changes in the source or slow changes in the reflectivity or transmissivity of the tape or changes in the detector sensitivity or changes in the lamp characteristics. Note that the feedback does not attempt to increase the gain of the detectors, although this could also be done. Nor is the source a constant intensity source. Rather, it is the light reflected from the tape or transmitted through the tape that is maintained at a constant level and not the level of light incident on the tape. The low pass filter 156 and 158 prevent the source from reacting to fast contrast chanes of the type generated by color marks, but the source intensity is adjusted when light from the tape detected by the sensors shows slower contrast changes.

The fast contrast signals which are not filtered by the low pass filters 156 and 158 are transmitted along lines 171 and 173 to a logic circuit 175 which recognizes patterns of signals corresponding to the various control points on the tape. Once the logic circuit 175 senses the tape position, a signal is sent to a tape transport controller 177 which is programmed with instructions on driving the tape upon reaching the various control points. For example, the transport controller may be programmed to stop the tape when the early warning point is reached, or may reverse the direction of the tape at that point. The transport controller 177 also controls a motor 179 which is part of a tape drive.

FIG. 9 shows a plot of a light sensor transfer characteristic. The ordinate of the plot is the output of the light sensor in arbitrary units, while the abscissa is the light level directed to the sensors. It is seen, that the ends of the curve are non-linear, but there is a central linear portion between points 181 and 183. The amplifiers 148 and 150 in FIG. 8 are referenced to voltages applied to terminals 152 and 154. The source 142 is controlled so that the light sensors effectively operate in the linear regions between points 181 and 183 and preferably at or near the central point 185.

Although the invention has been described with reference to magnetic tape cassettes, it will be understood that the invention is applicable to rolls and reels of other material such as film, printing ribbons, fabrics and the like being wound and unwound. Such webs are referred to as "tape" in the claims which follow.

I claim:

1. A tape winding system comprising,
   (a) A tape container with top, bottom and lateral walls therebetween having,
      (i) a pair of tape hubs, including a supply hub and a take-up hub, both hubs mounted for rotation in said container, said hubs having a length of tape wound therebetween with opposite tape ends wound one on each hub and with an intermediate length of tape between opposite tape ends, said intermediate length having color marks thereon which optically contrast with said tape, said color marks bonded to the tape with a tape thickness that is substantially uniform in transition places between where said color marks are present and absent,
      (ii) at least one tape guide mounted in said container at least partially defining a tape path for said intermediate tape length from the supply hub to the take-up hub, said tape path approaching a container lateral wall,
      (iii) optical means for directing light from a lamp onto the tape path,
   (b) means for moving tape along the tape path from one of said hubs to the other and having,
      (i) lamp means for illuminating said tape path through said optical means,
      (ii) a plurality of light sensors, each sensor disposed with a viewing axis for receiving light from a light transmission path of the optical means, and
      (iii) feedback means connected to said lamp means and to said light sensors for providing a level of illumination at said light sensors which is approximately constant, thereby establishing a reference level of light incident on the tape, whereby light received from the color marks departs from the reference level.

2. The system of claim 1 wherein said color marks are made of a dye or a powder.

3. The system of claim 1 wherein said lamp means and said light sensors are disposed such that said sensors detect light reflected from the tape, each sensor facing one end of each light transmission path.

4. The system of claim 1 wherein said lamp means and said light sensors are disposed such that said sensors detect light transmitted through the tape, each sensor facing said one end of each light transmission path.

5. The system of claim 1 wherein said optical means comprises an optical element mounted in said container adjacent to said tape path, said optical element having a plurality of mutually isolated light transmission paths within the tape container, each path within the container comprising one path end facing a tape portion constituting an optical track and another end exiting said container through a translucent area.

6. The system of claim 5 wherein said optical element comprises a light transmissive staircase pedestal supporting a plurality of prisms at different elevations each prism having a face corresponding to the location of an optical track, the base of said pedestal defining one aperture for the optical element and said prisms forming other apertures.

7. The system of claim 5 wherein said optical element comprises a plurality of fiber optic bundles having one common end forming said one aperture and having opposite ends forming said other apertures, terminating at different elevations, each fiber aperture corresponding to the location of an optical track.

8. The system of claim 5 wherein said optical element comprises a plurality of mirrors with reflective mirror surfaces facing a corresponding plurality of optical tracks and facing said sensors.

9. The system of claims 6, 7 or 8 wherein said tape container further comprises a reflective backing element aligned with an intercept of said light transmission paths with said tape but with said tape passing between said optical element and said backing element, whereby said reflective backing element reflects light from the optical element back to the optical element whenever light crosses the tape path.

10. The system of claim 1 wherein said optical means comprises a plurality of light pipes aligned in a plurality of linear paths, each linear path defined within an optical track scanned by a corresponding light pipe.

11. The system of claim 1 wherein said means for moving tape is responsive to said color marks.

12. In a tape playing system wherein the tape moves in a tape path and has color marks thereon indicative of data, the improvement comprising,
   (i) lamp means for illuminating a tape path in which a tape with color marks thereon moves relative to the lamp means,
   (ii) at least one light sensor disposed with a viewing axis for receiving light after impingement on the tape from the source,
   (iii) feedback means connected to said light intensity detection means and to said lamp means for controlling the intensity of illumination onto said tape path and directed to the light sensors such that an approximately constant level of illumination is set at the detectors defining the tape background and the contrast ratio between the color marks and the tape background exceeds a threshold level.

13. A method of sensing the position of tape which is being wound or unwound comprising,
   marking said tape with color marks contrasting with the tape, said color marks indicating tape position,
   rapidly moving said tape past a light source, directing a beam of light from the light source onto said moving tape, detecting light impinging on said tape by providing a threshold detection level corresponding to the tape background by adjusting said beam of light to an approximately constant level, sensing changes exceeding said threshold level due to said color marks, whereby information indicative of tape position is reproduced.

14. The method of claim 13 further specified by optically discriminating against background contrast changes which are less rapid than said rapid contrast changes.

* * * * *